(12) United States Patent
Liang

(10) Patent No.: US 10,837,208 B2
(45) Date of Patent: Nov. 17, 2020

(54) DOOR OF PET CAGE

(71) Applicant: Hongkun Liang, Zhong shan (CN)

(72) Inventor: Hongkun Liang, Zhong shan (CN)

( * ) Notice: Subject to any disclaimer, the term of this patent is extended or adjusted under 35 U.S.C. 154(b) by 83 days.

(21) Appl. No.: 15/641,652

(22) Filed: Jul. 5, 2017

(65) Prior Publication Data

US 2018/0347244 A1    Dec. 6, 2018

(30) Foreign Application Priority Data

Jun. 6, 2017 (CN) .................... 2017 2 0651937 U

(51) Int. Cl.

| | |
|---|---|
| *E05C 9/02* | (2006.01) |
| *E05C 9/18* | (2006.01) |
| *A01K 1/03* | (2006.01) |
| *E05B 13/00* | (2006.01) |
| *E05C 1/04* | (2006.01) |
| *E05B 63/14* | (2006.01) |

(52) U.S. Cl.
CPC .............. *E05C 9/028* (2013.01); *A01K 1/033* (2013.01); *E05B 13/002* (2013.01); *E05B 63/143* (2013.01); *E05C 1/04* (2013.01); *E05C 9/1808* (2013.01)

(58) Field of Classification Search
CPC ... E05C 9/028; A01K 1/033; Y10T 292/0844; Y10T 292/0839; Y10T 292/0836
See application file for complete search history.

(56) References Cited

U.S. PATENT DOCUMENTS

| 1,387,401 | A | * | 8/1921 | Hughes | ............... | E05B 65/0007 |
| | | | | | | 292/33 |
| 3,556,058 | A | * | 1/1971 | Smiler | ..................... | A01K 1/03 |
| | | | | | | 119/474 |
| 4,921,287 | A | * | 5/1990 | Horvath | .................. | E05C 17/14 |
| | | | | | | 292/106 |
| 6,681,720 | B1 | * | 1/2004 | Skurdalsvold | ........... | A01K 1/03 |
| | | | | | | 119/461 |
| 7,918,188 | B1 | * | 4/2011 | Harper | ................. | A01K 1/0245 |
| | | | | | | 119/481 |
| 8,210,127 | B2 | * | 7/2012 | Kaneda | ..................... | A01K 1/03 |
| | | | | | | 119/481 |
| 10,091,970 | B1 | * | 10/2018 | Flannery | ................ | A01K 1/034 |
| 2011/0041774 | A1 | * | 2/2011 | Northrop | ............. | A01K 1/0245 |
| | | | | | | 119/497 |
| 2018/0106076 | A1 | * | 4/2018 | Liang | ..................... | E05B 63/14 |

FOREIGN PATENT DOCUMENTS

WO    WO 2017/080127    *    5/2017

* cited by examiner

*Primary Examiner* — Gregory J Strimbu
(74) *Attorney, Agent, or Firm* — Oliff PLC

(57) ABSTRACT

A pet cage door system including a door frame multiple insertion buckles protruding toward a side of door frame. The door frame has a door that rotates relative to the door frame, and the door has a door bolt that transversely slides relative to the door. A first end of the door bolt is inserted into one of the insertion buckles, and a second end of the door bolt is connected to a vertical bar that transversely moves relative to the door. An end portion of the vertical bar has a transverse bar. The transverse bar has a turning-back bar that extends from an end of the transverse bar that and curves to form a semi-circular portion. The turning-back bar then extends parallel to the transverse bar, is spaced from the transverse bar, and is adapted to engage a second one of the insertion buckles.

2 Claims, 3 Drawing Sheets

DOOR OF PET CAGE

BACKGROUND

Technical Field

The present utility model relates to a door of a pet cage.

Related Art

Nowadays, many people may keep small animals as pets in today's society. In this case, pet cages become necessities naturally. In order to prevent a pet from escaping from a cage, a cage door of a traditional pet cage is usually locked by using a latch. However, when locking, the traditional latch has only one locking point, which cannot firmly lock the door of the pet cage.

Therefore, the present utility model is generated based on the foregoing disadvantages.

SUMMARY

An objective of the present utility model is to overcome disadvantages in the prior art to provide a door of a pet cage having a simple structure and being firmly locked.

The present utility model is implemented by means of the following technical solutions.

A door of a pet cage includes a door frame 1 disposed on a cage body, where the door frame 1 is provided with multiple insertion buckles 2 protruding toward one side of the door frame 1, the door frame 1 is further provided with a door stop 3 capable of rotating relative to the door frame 1 to close same, the door stop 3 is provided with a door bolt 4 capable of transversely sliding relative to same, one end of the door bolt 4 can be in insertion fit with one of the insertion buckles 2, the other end of the door bolt 4 is connected to a vertical bar 5 capable of transversely moving relative to the door stop 3 along with the door bolt 4, the end portion of the vertical bar 5 is provided with a transverse bar 6 that extends toward one side of the vertical bar 5, the end portion of the transverse bar 6 is provided with a turning-back bar 7 that extends toward one side of the vertical bar 5 and keeps spaced from the transverse bar 6, and the turning-back bar 7 can be in insertion fit with the other insertion buckle 2 on the door frame 1.

The door of the pet cage as stated above is characterized in that: the door bolt 4 is rotationally connected to the door stop 3, and the door bolt 4 includes a latch 41 and a handle 42, which can rotate relative to the door stop 3, where the handle 42 is connected to the latch 41, the latch 41 is in insertion fit with one insertion buckle 2, the door stop 3 is provided with an engaging position 8 capable of engaging with or disengaging from the handle 42 after the door bolt 4 rotates relative to the door stop 3, the latch 41 is further provided with an annular slot 43, and the vertical bar 5 is provided with a reducing sleeve 9 that is sleeved in the annular slot 43 and is rotationally connected to the latch 41.

The door of the pet cage as stated above is characterized in that: the door stop 3 includes multiple vertical rods 31 that are spaced from one other, the engaging position 8 is formed in a space between the adjacent vertical rods 31, the handle 42 is U-shaped, and after the handle 42 rotates relative to the door stop 3, the end portion of the handle 42 is inserted into the space between the adjacent vertical rods 31 or withdraws from the space between the adjacent vertical rods 31.

The door of the pet cage as stated above is characterized in that: the vertical bar 5, the transverse bar 6 and the turning-back bar 7 are of an overall structure formed by integrated bending.

The door of the pet cage as stated above is characterized in that: the middle of the vertical bar 5 is rotationally connected to the latch 41 through the reducing sleeve 9, the upper end and the lower end of the vertical bar 5 are provided with the transverse bar 6 separately, the middle of the transverse bar 6 is connected to the vertical bar 5, one end of the transverse bar 6 is connected to the turning-back bar 7, and the other end of the transverse bar 6 is provided with an insertion segment 61 capable of being in inserted connection with the insertion buckle 2 on the door frame 1.

The door of the pet cage as stated above is characterized in that: the outer side of the vertical bar 5 is further provided with a reinforcing bar 10 connected to the transverse bar 6.

The door of the pet cage as stated above is characterized in that: the door stop 3 is provided with a sleeve buckle 11 that allows the transverse bar 6 to slide therein.

As compared with the prior art, the present utility model has the following advantages.

1. A door bolt on a door stop of the present utility model can fit with an insertion buckle on a door frame, and a turning-back bar spaced from the door bolt also can be in insertion fit with the insertion buckle on the door frame, so when the door bolt fits with the insertion buckle, the turning-back bar is in inserted connection with an insertion buckle at another place of the door frame. Therefore, when a door of a pet cage is locked, multiple locking points are provided, so as to ensure locking firmness of the door of the pet cage and to guarantee that a pet cannot escape.

2. A latch of the present utility model is rotationally connected to a vertical bar through a reducing sleeve on the vertical bar, so the latch can rotate relative to the vertical bar, and after a handle is pulled to rotate, the handle can engage with or disengage from an engaging position on a door stop. Therefore, when the latch is inserted into the insertion buckle, the handle engages with the engaging position to make the handle blocked, so the latch cannot slide transversely. Accordingly, the latch keeps in inserted connection with the insertion buckle, and the turning-back bar also keeps in inserted connection with the insertion buckle. When it is necessary to open the door of the cage, the handle is rotated to make the handle disengage from the engaging position. In this case, the handle is no longer blocked, the latch can slide transversely to disengage from the insertion buckle, and when sliding transversely, the latch also pushes the vertical bar transversely, so that the turning-back bar disengages from the insertion buckle. Accordingly, the door of the cage is unlocked. Because it is necessary to rotate the handle in order to make the latch slide transversely, the stability of insertion fit between the latch and the insertion buckle is ensured, accidental disengagement of the latch is prevented, and the locking firmness of the door of the cage is ensured.

3. The present utility model is simple in structure, convenient to manufacture, and suitable for popularization.

DETAILED DESCRIPTION

The present utility model is further described below with reference to the accompanying drawings.

Embodiment 1

Figure 1:
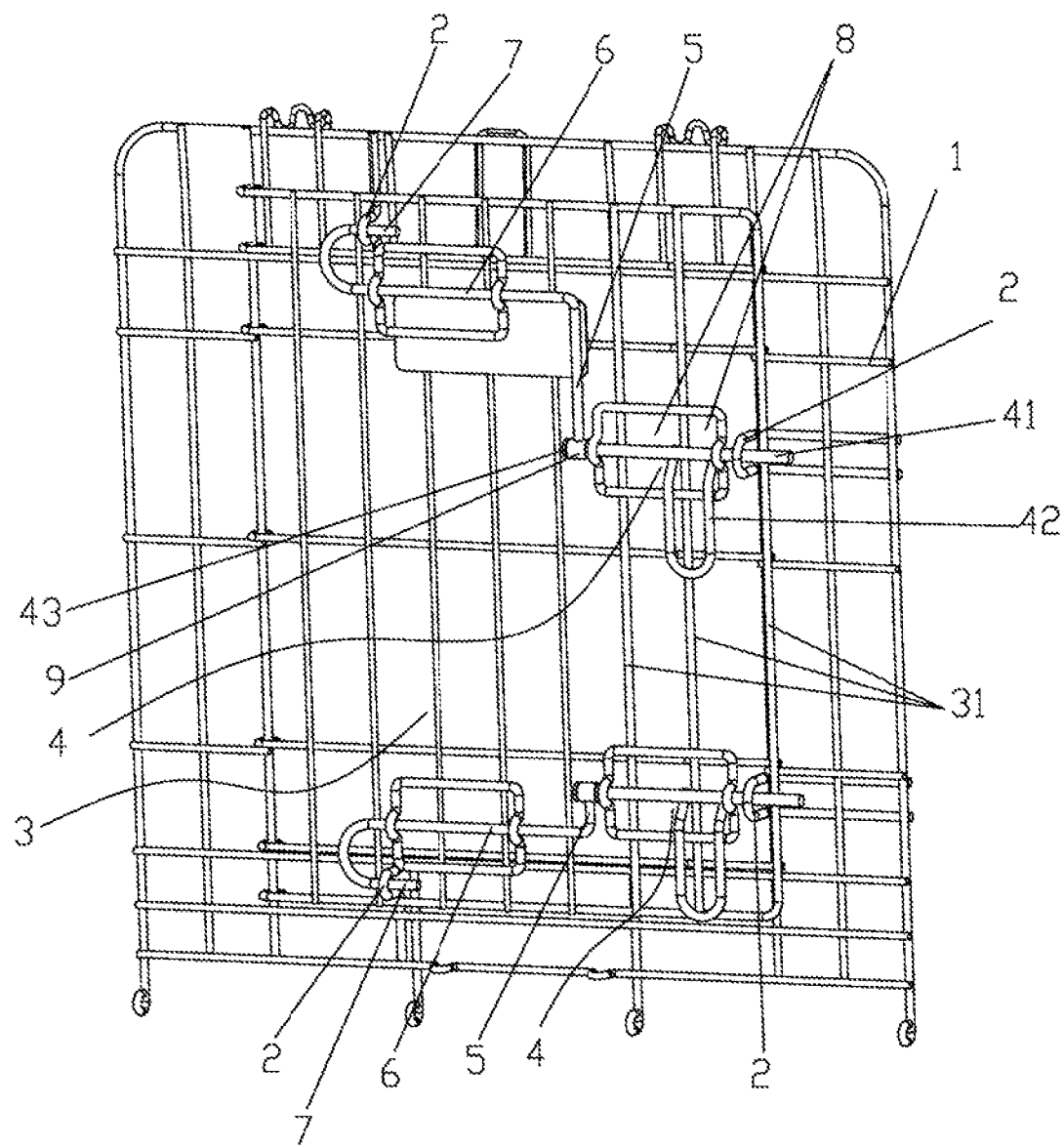
FIG. 1 is a three-dimensional diagram of Embodiment 1 of the present utility model during closing of a door stop.

As shown in FIG. 1, a door of a pet cage includes a door frame 1 disposed on a cage body, where the door frame 1 is provided with multiple insertion buckles 2 protruding toward one side of the door frame 1, the door frame 1 is further provided with a door stop 3 capable of rotating relative to the door frame 1 to close same, the door stop 3 is provided with a door bolt 4 capable of transversely sliding relative to same, one end of the door bolt 4 can be in insertion fit with one of the insertion buckles 2, the other end of the door bolt 4 is connected to a vertical bar 5 capable of transversely moving relative to the door stop 3 along with the door bolt 4, the end portion of the vertical bar 5 is provided with a transverse bar 6 that extends toward one side of the vertical bar 5, the end portion of the transverse bar 6 is provided with a turning-back bar 7 that extends toward one side of the vertical bar 5 and keeps spaced from the transverse bar 6, and the turning-back bar 7 can be in insertion fit with the other insertion buckle 2 on the door frame 1. The door bolt 4 on the door stop 3 can fit with the insertion buckle 2 on the door frame 1, and the turning-back bar 7 spaced from the door bolt 4 also can be in insertion fit with the insertion buckle 2 on the door frame 1, so when the door bolt 4 fits with the insertion buckle 2, the turning-back bar 7 is in inserted connection with the insertion buckle 2 at another place of the door frame 1. Therefore, when the door of the pet cage is locked, multiple locking points are provided, so as to ensure locking firmness of the door of the pet cage and to guarantee that a pet cannot escape.

As shown in FIG. 1, the door bolt 4 is rotationally connected to the door stop 3, and the door bolt 4 includes a latch 41 and a handle 42, which can rotate relative to the door stop 3, where the handle 42 is connected to the latch 41, the latch 41 is in insertion fit with the insertion buckle 2, the door stop 3 is provided with an engaging position 8 capable of engaging with or disengaging from the handle 42 after the door bolt 4 rotates relative to the door stop 3, the latch 41 is further provided with an annular slot 43, and the vertical bar 5 is provided with a reducing sleeve 9 that is sleeved in the annular slot 43 and rotationally connected to the latch 41. The latch 41 is rotationally connected to the vertical bar 5 through the reducing sleeve 9 on the vertical bar 5, so the latch 41 can rotate relative to the vertical bar 5, and after the handle 42 is pulled to rotate, the handle 42 can engage with or disengage from the engaging position 8 on the door stop 3. Therefore, when the latch 41 is inserted into the insertion buckle 2, the handle 42 engages with the engaging position 8 to make the handle 42 blocked, so the latch 41 cannot slide transversely. Accordingly, the latch 41 keeps in inserted connection with the insertion buckle 2, and the turning-back bar 7 also keeps in inserted connection with the insertion buckle 2. When it is necessary to open the door of the cage, the handle 42 is rotated to make the handle 42 disengage from the engaging position 8. In this case, the handle 42 is no longer blocked, the latch 41 can slide transversely to disengage from the insertion buckle 2, and when sliding transversely, the latch 41 also pushes the vertical bar 5 transversely, so that the turning-back bar 7 disengages from the insertion buckle 2. Accordingly, the door of the cage is unlocked. Because it is necessary to rotate the handle 42 in order to make the latch 41 slide transversely, the stability of insertion fit between the latch 41 and the insertion buckle 2 is ensured, accidental disengagement of the latch 41 is prevented, and the locking firmness of the door of the cage is ensured.

As shown in FIG. 1, the door stop 3 includes multiple vertical rods 31 that are spaced from one other, the engaging position 8 is formed in a space between the adjacent vertical rods 31, the handle 42 is U-shaped, and after the handle 42 rotates relative to the door stop 3, the end portion of the handle 42 is inserted into the space between the adjacent vertical rods 31 or withdraws from the space between the adjacent vertical rods 31. During inserted connection between the latch 41 and the insertion buckle 2, the end portion of the handle 42 is inserted into a space between the adjacent vertical rods 31. If the latch 41 is driven to move transversely, the vertical rods 31 will block the handle 42, so as to ensure that the latch 41 keeps in an inserted connection state with the insertion buckle 2. When it is necessary to open the door of the cage, the handle 42 is rotated, and the end portion of the handle 42 withdraws from the space between the adjacent vertical rods 31 in a rotating process. In this case, the latch 41 can be pushed transversely to make the latch 41 disengage from the insertion buckle 2.

Figure 2:
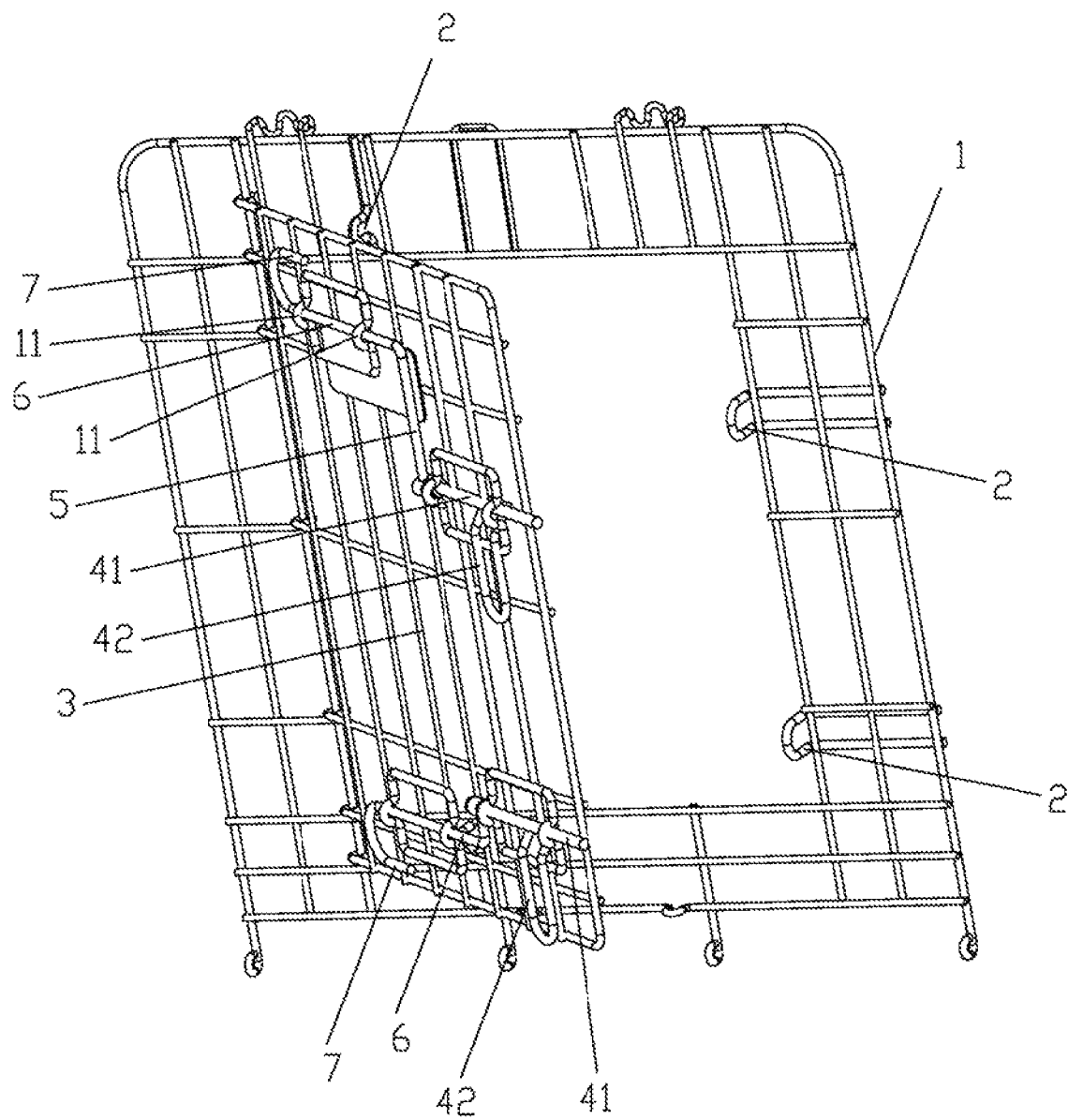
FIG. 2 is a three-dimensional diagram of Embodiment 1 of the present utility model during opening of the door stop.

As shown in FIG. 1 and FIG. 2, the vertical bar 5, the transverse bar 6 and the turning-back bar 7 are of an overall structure formed by integrated bending.

As shown in FIG. 2, the door stop 3 is provided with a sleeve buckle 11 that allows the transverse bar 6 to slide therein.

Embodiment 2

Figure 3:
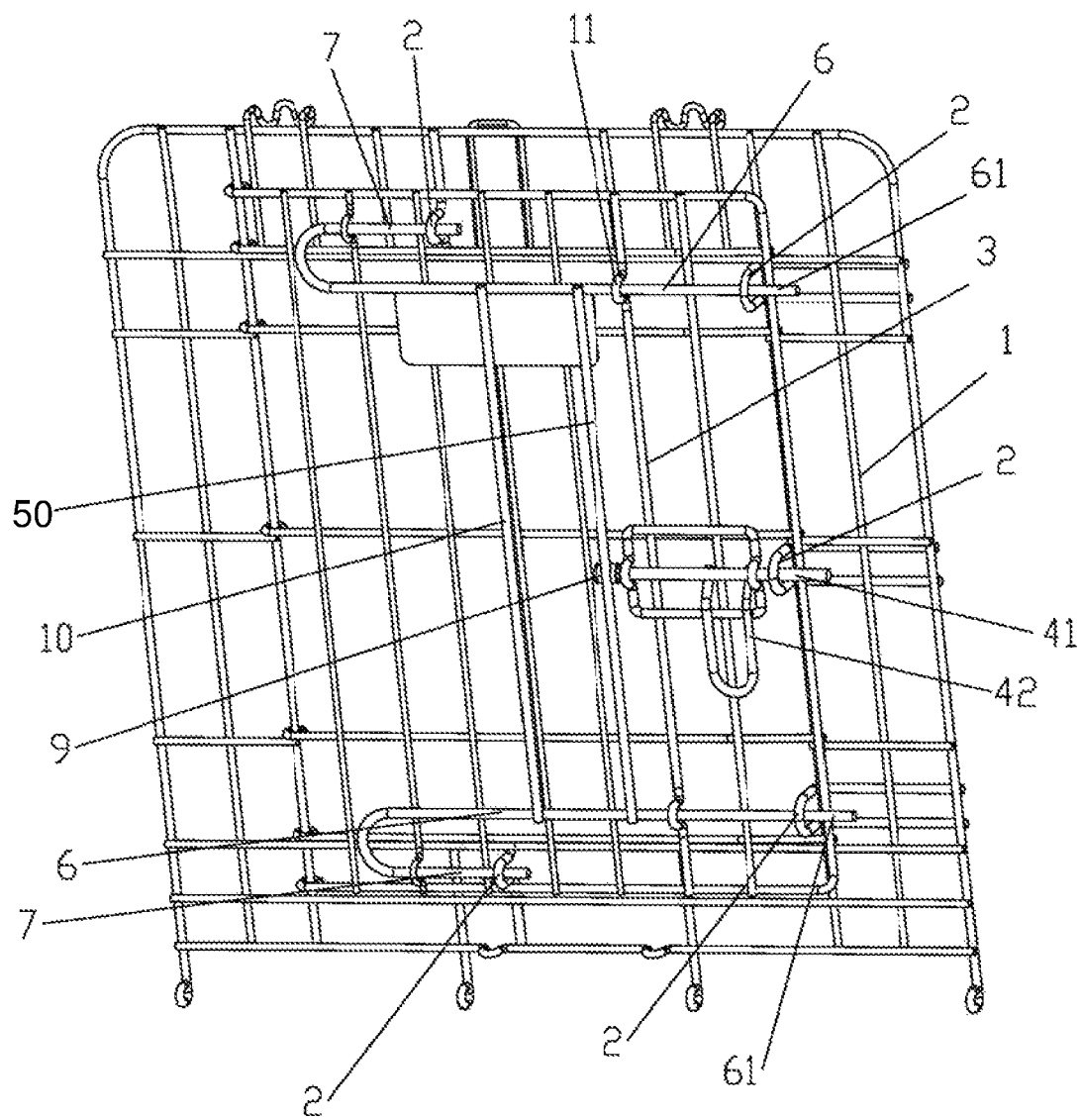
FIG. 3 is a three-dimensional diagram of Embodiment 2 of the present utility model.

As shown in FIG. 3, the difference between Embodiment 2 and Embodiment 1 is as follows.

The middle of the vertical bar 50 (similar to vertical bar 5 of Embodiment 1 discussed above) is rotationally connected to the latch 41 through the reducing sleeve 9, the upper end and the lower end of the vertical bar 50 are provided with the transverse bar 6 separately, the middle of the transverse bar 6 is connected to the vertical bar 50, one end of the transverse bar 6 is connected to the turning-back bar 7, the other end of the transverse bar 6 is provided with an insertion segment 61 capable of being in inserted connection with the insertion buckle 2 on the door frame 1, and the outer side of the vertical bar 50 is further provided with a reinforcing bar 10 connected to the transverse bar 6. Therefore, the upper and lower portions of the door stop 3 both fit with the insertion buckles 2 on the door frame 1 through the turning-back bar 7 and the insertion segment 61 respectively, and the middle of the door stop 3 fits with the insertion buckle 2 on the door frame 1 through the latch 41. Therefore, the present embodiment has five locking points, thus ensuring locking firmness of the door of the pet cage.

What is claimed is:

1. A door system comprising:
    a door frame adapted to be disposed on a pet cage body, the door frame including a plurality of insertion buckles protruding toward a side of the door frame, and a door configured to rotate relative to the door frame, the door including a door bolt configured to transversely slide relative to the door, a first end of the door bolt being configured to be inserted into a first one of the plurality of insertion buckles, and a second end of the door bolt is connected to a vertical bar configured to transversely slide relative to the door along with the door bolt, the door bolt being rotationally connected to the door, the door bolt including a handle, the handle being configured to rotate relative to the door, the first end of the door bolt being a latch configured to be inserted into the first one of the plurality of insertion buckles, the handle being connected to the latch, wherein:

a transverse bar extends transversely from an end portion of the vertical bar, a turning-back bar extends form an end portion of the transverse bar, the turning-back bar includes a first portion that curves from the end portion of the transverse bar away from a central axis of the transverse bar to form a semi-circular arc portion of the turning-back bar, the turning-back bar includes a second portion that extends from the semi-circular arc portion in a direction that is parallel to the central axis of the transverse bar and that is direction as the central axis of the transverse bar and the turning-back bar is spaced apart from the transverse bar, and an end of the second portion of the turning-back bar is configured to be inserted into a second one of the plurality of insertion buckles of the door frame, a handle engaging portion is located on the door, the handle is located on the door stop, the engaging position is configured to engage with or disengage from the handle engaging portion upon the door bolt rotating relative to the door, the second end of the door bolt includes an annular slot, and the vertical bar includes a reducing sleeve that is sleeved in the annular slot and is rotationally connected to the door bolt.

2. A door system comprising:

a door frame adapted to be disposed on a pet cage body, the door frame including a plurality of insertion buckles protruding toward a side of the door frame, and a door configured to rotate relative to the door frame, the door including a door bolt configured to transversely slide relative to the door, a first end of the door bolt being configured to be inserted into a first one of the plurality of insertion buckles, and a second end of the door bolt is connected to a vertical bar configured to transversely slide relative to the door along with the door bolt, the door bolt being rotationally connected to the door, the door bolt including a handle, the handle being configured to rotate relative to the door, the first end of the door bolt being a latch configured to be inserted into the first one of the plurality of insertion buckles, the handle being connected to the latch, wherein:

a transverse bar extends transversely from an end portion of the vertical bar, a turning-back bar extends form an end portion of the transverse bar, the turning-back bar includes a first portion that curves from the end portion of the transverse bar away from a central axis of the transverse bar to form a semi-circular arc portion of the turning-back bar, the turning-back bar includes a second portion that extends from the semi-circular arc portion in a direction that is parallel to the central axis of the transverse bar and that is spaced apart from the transverse bar, and an end of the second portion of the turning-back bar is configured to be inserted into a second one of the plurality of insertion buckles of the door frame, a handle engaging portion is located on the door, the handle engaging is configured to engage with or disengage from the handle engaging portion upon the door bolt rotating relative to the door, the second end of the door bolt includes an annular slot, the vertical bar includes a reducing sleeve that is sleeved in the annular slot and is rotationally connected to the door bolt, the reducing sleeve connects the door bolt to the vertical bar, and the reducing sleeve allows the door bolt to rotate relative to the vertical bar, and upon transverse sliding movement of the door bolt, the vertical bar, the transverse bar, and the turning-back bar correspondingly slide with the door bolt.

\* \* \* \* \*